United States Patent [19]

Waldherr

[11] Patent Number: 4,835,869
[45] Date of Patent: Jun. 6, 1989

[54] HACKSAW FRAME AND BLADE HOLDER

[76] Inventor: Arthur Waldherr, 201 Freeport Dr., Bloomingdale, Ill. 60108

[21] Appl. No.: 223,434

[22] Filed: Jul. 25, 1988

[51] Int. Cl.⁴ .............................................. B27B 21/06
[52] U.S. Cl. ...................................... 30/507; 30/506; 30/510; 30/513
[58] Field of Search .................. 30/506, 507, 510, 513

[56] References Cited

U.S. PATENT DOCUMENTS 1,245,345  11/1917  Howell .................................. 30/507
1,835,638  12/1931  Cunneen .............................. 30/513

Primary Examiner—Frederick R. Schmidt
Assistant Examiner—Maurina Rachuba
Attorney, Agent, or Firm—Emrich & Dithmar

[57] ABSTRACT

A hacksaw frame having a blade holder having opposed blade clamping surfaces and means for locking the surfaces in clamping relationship loosely mounted on the frame for holding a hacksaw blade, and tensioning means on the frame for holding a blade under tension.

11 Claims, 1 Drawing Sheet

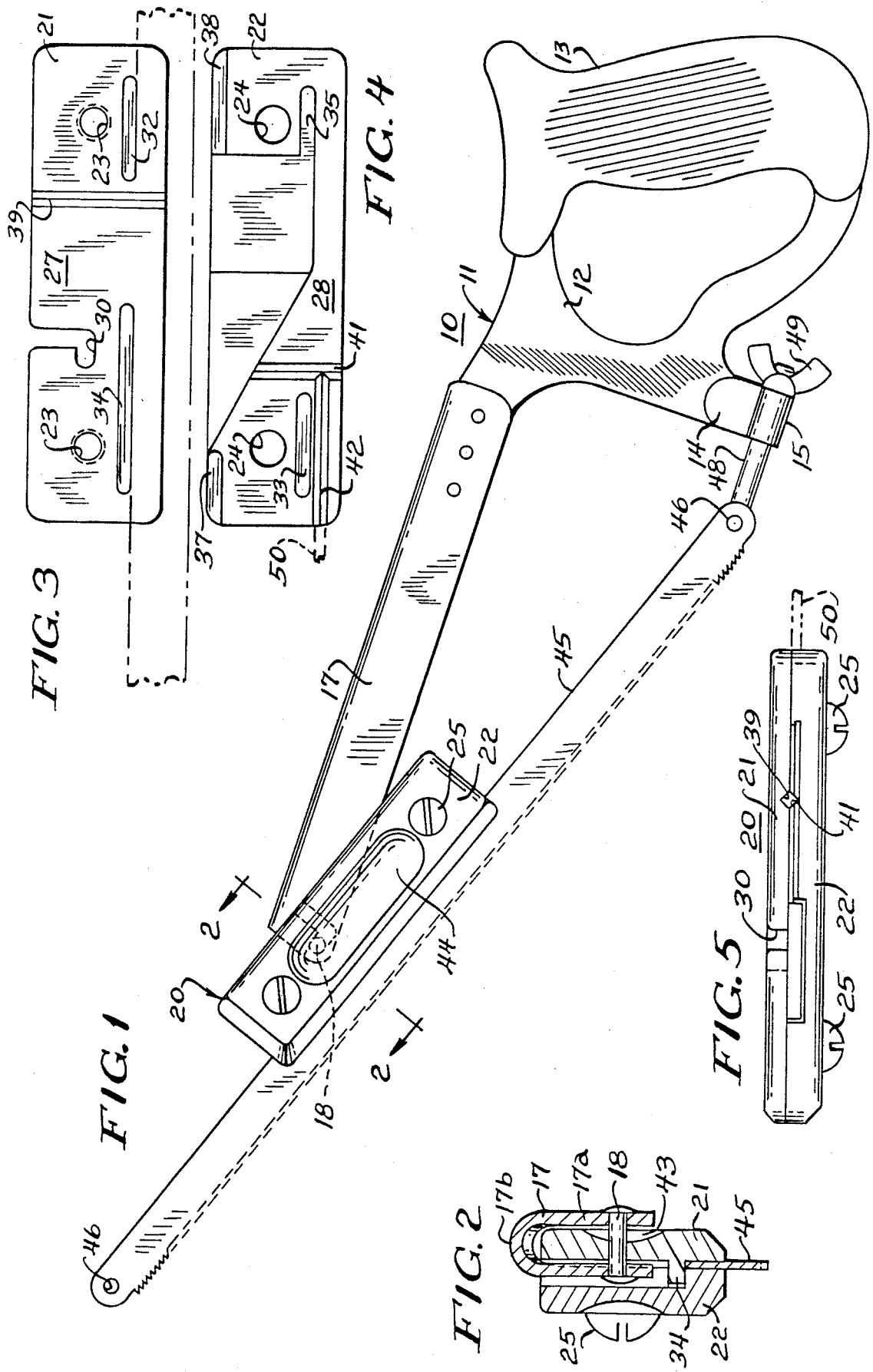

HACKSAW FRAME AND BLADE HOLDER

BACKGROUND OF THE INVENTION

This invention relates to a hacksaw and more particularly to a novel combination of hacksaw frame and blade or tool holder which cooperate to provide, depending upon the length of the saw blade, a hacksaw or a saber saw.

Converting a hacksaw into a saber saw is not new, the idea being disclosed in the Cunneen U.S. Pat. No. 1,835,638. The Cunneen patent shows a hacksaw frame which is convertible from the traditional configuration shown in FIG. 1 to another configuration shown in FIG. 3. The hacksaw may be used as a saber saw as illustrated in FIG. 1 or as a normal hacksaw with a shorter blade as seen in FIG. 4. The Cunneen patent is useful but involves a cumbersome and time consuming conversion from one form to another. In addition, due to the various mechanisms there disclosed, the hacksaw frame is more expensive than the present invention.

Accordingly, it is a principal object of the present invention to provide a relatively inexpensive hacksaw frame which is convertible to a saber saw in an easy and efficient manner.

Another object of the present invention is to provide a tool which may be combined with a hacksaw frame to convert it from a normal hacksaw to a saber saw.

Another object of the present invention is to provide a frame member having a handle attached thereto at one end thereof and mounting means at the other end thereof, a blade holder removably mounted on the mounting means and having clamping mechanism for securely holding a blade, the blade holder when mounted on the main frame member maintaining a hacksaw blade at an acute angle with the main frame member, and a blade extending between the one end of the frame and the blade holder.

Another object of the present invention is to provide a hacksaw frame comprising, a frame having blade holding means loosely mounted on the frame for holding a hacksaw blade therein, tensioning means on the frame for holding a blade under tension, the blade holding means having opposed blade clamping surfaces and means for locking the surfaces in clamping relationship.

A final object of the present invention is to provide a holder for a tool comprising, two generally rectangular members each having a clamping surface, the clamping surface being in registry when the two members are mated, means for clamping the two members together thereby fixedly retaining a tool positioned between the surfaces, slot means on at least one of the members for mounting the holder on a hacksaw frame, and stop means on one of the opposed clamping surfaces to locate a hacksaw blade in predetermined position with respect to the holder.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

FIG. 1 is a side elevational view of a hacksaw frame and tool holder of the present invention showing its configuration as a saber saw;

FIG. 2 is a view in section of a combination hacksaw frame and tool holder illustrated in FIG. 1 as taken along lines 2—2 thereof;

FIG. 3 is a plan view of the inside clamping surface of one part of the tool holder;

FIG. 4 is an inside view of the clamping surface of the other part of the tool holder; and FIG. 5 is a top view of the tool holder illustrated in FIG. 1.

DETAILED DESCRIPTION OF THE PREFERRED EMBODIMENT

Referring to the drawings, there is disclosed in FIG. 1 a hacksaw 10 which includes a main frame 11 having a handle member 12 provided with a customary grip 13. The grip 13 may be made of plastic, wood or the like. A leg 14 extends downwardly from the handle member 12 and terminates in a ferrule 15 which is provided with a central aperture. The frame 11 has a axially extending top frame member 17 which if viewed in cross-section illustrated in FIG. 2, is an upside down "U", that is it is provided with two spaced apart longitudinally extending sides 17a interconnected by a bight 17b, the frame member 17 being of one piece. At the end of the frame member 17 away from the handle 12 is a stud or rivet 18 which joins the two sides 17a to each other.

The holder 20 is illustrated and used in FIGS. 1 and 2 and also in FIGS. 3-5. The holder 20 is generally rectangular in shape and is comprised of a first member 21 and a second member 22. Each of the members 21 and 22 have axially spaced apart apertures which are in registry when the first and second members are in mated position as will be described. The first member 21 has a pair of tapped apertures 23 and the second member 22 has a corresponding pair of apertures 24. As shown in FIG. 5, when the first piece 21 is mated with the second piece 22, the apertures are aligned to accept screws 25, each of which extends through one of the apertures 24 and into the tapped aperture 23 thereby to clamp the two members 21 and 22 together for a purpose to be explained.

Each of the members 21 and 22 is provided with a corresponding clamping surface 27 and 28 on the interior of the respected member. In the top edge of the first member 21 is a key hole shaped slot 30 which is used to mount the holder 20 onto the stud or rivet 18 in the hacksaw frame 11.

Referring to FIGS. 3 and 4 it will be seen that the first and second members 21 and 22 are illustrated with their clamping surfaces, 27 and 28, facing outwardly. However, the two members 21, 22 are not shown in mating relationship. The second member 22 is actually rotated 180° from its mating position in FIG. 4. The first member 21 has a longitudinally extending ledge 32 positioned underneath the right hand tapped aperture 23. In the mated position, that is when the two members 21 and 22 are as illustrated in FIG. 5, a corresponding slot 33 in the second member 22 receives the ledge 32 therein. The slot 33 is constructed and arranged so that the inside dimensions of the slot are a little bit larger than the outside dimensions of the ledge 32 so the slot easily receives the ledge therein. Similarly, the first member 21 has a second axially spaced and longitudinally extending ledge 34 which is received in the slot 35 in the second member 22. The ledges 32, 34 received in the slots 33, 35 align the first and second members 21, 22 and also position the blade 45 as will be explained. Two spacers 37 and 38 extend outwardly from the clamping surface 28 of the second member 22 and maintain the two clamping surfaces 27 and 28 in predetermined relationship when the first and second members 21 and 22 are mated, as seen in FIG. 5.

The first member 21 has a transversely extending groove 39 which in the mating position of FIG. 5 is matched to a corresponding groove 41 in the clamping surface 28 of the second member 22 to provide, as illustrated in FIG. 5, a diamond shaped groove suitable for holding a tool when the holder 20 is clamped as seen in FIG. 5, which tool may be a nail or file for scraping or an awl for punching or the like. Similarly, an axially extending groove 42 is in the surface 28 of second member 22 which may be used for the same purpose as grooves 39, 41.

Finally, two indentations 43, 44 are respectively positioned in the first and second members 21, 22 to provide a convenient finger grip when the holder 20 is in use. The saw blade 45 having apertures 46 at each end thereof is positioned in the hacksaw 10 by connecting one of the apertures 46 to a tensioning member 48 which fits through the ferrule 15 and is locked in place and maintained in tension by means of a wing nut 49. Tension on the blade 45 causes the holder 20 to move to the right as seen in FIG. 1 to force the stud 18 into the front of the key hole slot 30 which retains the holder 20 on the frame 17.

When the hacksaw 10 is to be used as as hacksaw, a blade 45 shorter than the one illustrated in the drawings may be used. In this case the hacksaw 10 with a shorter blade than the one illustrated, may be used in the configuration shown or may be used with a downwardly extending frame member (not shown) which frame member (generally parallel to handle member 12) forms a front leg as to provide a hacksaw of the usual construction wherein the blade is positioned parallel to the frame member 17. In the present construction, the blade holder 20 acts to provide both an improved sawing angle and a fast and convenient interchange between a hacksaw construction and a saber saw construction as shown. The holder 20 is easy to manipulate and simply requires that it be inserted between the legs 17a of the frame 17 in such a manner that the key hole slot 30 engage the stud or rivet 18. Thereafter by securing fasteners or screws 25 in the tapped apertures 23, the blade 45 is fixedly clamped between the two members 21, 22 of the blade holder 20 and the tensioning aspect provided by the wing nut 49 maintains the blade holder 20 firmly engaged onto the rivet or stud 18, thereby preventing the blade holder 20 and hence the blade 45 from working loose during sawing opertion. The holder 20, as illustrated in FIG. 5, may be used by itself with a tool 50 such as a nail, scraper, drill, or file for a variety of tasks and conveniently can be used with the tool 50 either in the position illustrated (along slot 42) which is axially aligned with the longitudinally axis of the holder 20 or with the tool 50 being positioned in the slot formed by the two grooves 39 and 41 so that the holder 20 has the tool extending perpendicularly therefrom. In either case, as a stand alone holder 20 or in cooperation with the hacksaw frame 11, the holder provides a convenient and easy mechanism for converting a hacksaw into a saber saw.

While there has been disclosed what is considered to be the preferred embodiment of the present invention, it is understood that various changes in the details may be made without departing from the spirit, or sacrificing any of the advantages of the present invention.

I claim:

1. A hacksaw comprising, a frame member having two longitudinally extending sides interconnected by a bight, a handle attached thereto at one end thereof and stud mounting means at the other end thereof, a blade holder removably and pivotally mounted on said stud mounting means between said sides and having clamping mechanism for securely holding a blade, said blade holder when mounted on said main frame member maintaining a hacksaw blade at an acute angle with said main frame member, and a blade extending between the one end of said frame and said blade holder.

2. The hacksaw of claim 1, and further comprising means near the one end of said frame member for maintaining the blade clamped by said blade holder under tension.

3. The hacksaw of claim 2, wherein said blade has a length in excess of the length of said frame member to extend beyond said frame member and form a saber saw.

4. A hacksaw frame comprising, a frame having blade holding means loosely mounted on said frame for holding a hacksaw blade therein, tensioning means on said frame for holding a blade under tension, said blade holding means having opposed blade clamping surfaces and means for locking said surfaces in clamping relationship, said blade holding means having means on said opposed blade clamping surfaces for positioning the associated blade in a preselected orientation, wherein one of said blade clamping surfaces has a slot therein and the other a ledge, said ledge fitting in said slot when said surfaces are in clamping relationship to position the associated blade in a preselected orientation.

5. The hacksaw frame of claim 4, wherein said blade holding means has opposed channels in each blade clamping surface extending to an edge of the blade holder to enable a tool to be clamped in said opposed channels.

6. The hacksaw frame of claim 4, wherein said frame has a stud and said blade holding means has a mounting slot in one of said blade clamping surfaces to mount said blade holding means on said stud.

7. A holder for a tool comprising, two generally rectangular members each having a clamping surface, said clamping surface being in registry when the two members are mated, means for clamping the two members together thereby fixedly retaining a tool positioned between said surfaces, slot means on at least one of said members for mounting said holder on a hacksaw frame, and stop means on one of said opposed clamping surfaces to locate a hacksaw blade in predetermined position with respect to said holder.

8. The holder of claim 7, wherein said means for retaining said hacksaw blade comprises spaced apart apertures in each of said members, at least two of said apertures being tapped to recieve a screw therein to maintain said members in mated position.

9. The holder of claim 7, wherein said stop means is a ledge on one of said members and a mating slot on the other of said members for receiving said ledge when said members are in mated position.

10. The holder of claim 7, wherein each member has a groove therein which when said members are mated in registry to provide tool holding means.

11. The holder of claim 7, wherein said slot means is on only one of said members and is "L" shaped.

* * * * *